(12) United States Patent
Gatton

(10) Patent No.: US 7,703,206 B1
(45) Date of Patent: Apr. 27, 2010

(54) UNIVERSAL WHEEL PYLON

(75) Inventor: Geoffrey L. Gatton, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 1457 days.

(21) Appl. No.: 11/069,092

(22) Filed: Mar. 1, 2005

(51) Int. Cl.
*B21D 53/26* (2006.01)
*B23B 5/22* (2006.01)

(52) U.S. Cl. .......................................... 29/894; 279/2.02

(58) Field of Classification Search ................ 29/802.2, 29/25 A, 563, 564, 894, 894.3, 894.324, 894.325, 29/894.381; 279/2.11, 2.02, 2.03, 133, 137, 279/144, 51; 409/209, 219, 197; 269/48.1
See application file for complete search history.

(56) References Cited

U.S. PATENT DOCUMENTS

| 4,034,786 A | 7/1977 | Feldmann et al. |
| 4,409,811 A | 10/1983 | Bosch |
| 5,441,284 A | 8/1995 | Mueller et al. |
| 5,562,007 A | 10/1996 | Seymour |
| 5,820,137 A | 10/1998 | Patterson |
| 6,126,174 A | 10/2000 | Reece et al. |
| 6,862,785 B2 | 3/2005 | Baumgartner |

*Primary Examiner*—John C Hong
(74) *Attorney, Agent, or Firm*—MacMillan, Sobanski & Todd, LLC

(57) ABSTRACT

A wheel pylon includes a tubular mounting shaft that slidably receives a tubular support shaft. A helical spring is disposed within the shafts and a stop, formed from a resilient material, is mounted upon an end of the support shaft. The wheel pylon extends axially to accommodate wheel discs having different axial recess depths.

10 Claims, 5 Drawing Sheets

UNIVERSAL WHEEL PYLON

BACKGROUND OF THE INVENTION

This invention relates in general to fixtures for mounting vehicle wheel castings on machine tools during finishing operations and in particular to pylons for fixtures for mounting wheel castings having wheel discs of differing recess depths upon a wheel lathe for machining.

Lightweight alloy vehicle wheels are becoming increasingly popular. Such wheels typically include an annular wheel rim that carries a tire. The wheel rim has a recessed center portion that facilitates mounting the tire upon the rim. The ends of the wheel rim include inboard and outboard tire bead seats that support the tire. Inboard and outboard tire bead retaining flanges are formed on the ends of the wheel rim to retain the tire upon the wheel rim.

A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub. The mounting holes are drilled equally spaced about a circle that is concentric with the pilot hole. The central pilot hole is used to position the wheel on a vehicle and the mounting holes are used to secure the wheel to the vehicle.

One conventional process for manufacturing lightweight alloy wheels involves pouring molten metal into a wheel mold to form a casting of the wheel. After the molten metal solidifies, the wheel casting is removed from the mold. The wheel casting is oversized and is machined to final shape with machining operations.

Finishing the wheel casting typically includes multiple machining operations. Sawing machines cut any casting gates and risers from the wheel casting. A drilling machine is used to drill the central pilot hole and the wheel mounting holes through the wheel hub. The wheel casting is mounted upon a lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. During the finishing of the outside of the wheel rim, the tire bead seats are turned to their final diameter. Additionally, portions of the wheel can be painted or covered with a clear coating to protect the wheel from corrosion and/or enhance its appearance.

The machining operations are carried out with highly automated machining stations, which usually include numerically controlled machine tools designed to complete one or more specific machining operations. The wheels are sequentially moved between the machining stations, with the machine tool located at each station completing a portion of the required machining. For example, a typical wheel production facility can include multiple lathe stations. The production facility can include a first lathe station for facing the inboard wheel hub surface, a second lathe station for facing the outboard wheel disc surface, a third lathe station to turn the inside surface of the wheel rim and a fourth lathe station to turn the outside surface of the wheel rim. Alternately, the production facility can include a lathe capable of multiple machining operations to perform several of the above operations at a single machining station. Mounting fixtures are typically designed for each machine tool to facilitate mounting and dismounting the wheels on the tool.

Referring now to the drawings, there is shown in FIG. 1 a sectional view of a known fixture, generally indicated at 10, for mounting a vehicle wheel upon a lathe in accordance with the prior art. In the interest of simplicity, fasteners, which secure components of the mounting fixture 10 to one another, are not shown in FIG. 1. A typical vehicle wheel 15, which will be described below, is shown mounted on the fixture 10.

The mounting fixture 10 includes an adapter plate 20 that can be secured to the rotatable spindle of a lathe (not shown) by conventional means. The adapter plate 20 includes a circular base 21 that has a central circular opening 22 formed therethrough. The adapter plate 20 also includes a cylindrical sleeve 23 extending axially from the base 21. The sleeve 23 has a plurality of axial slots 24 (one shown) formed there through that are spaced equally about the circumference of the sleeve 24. The purpose of the slots 24 will be explained below. The adapter plate 20 further carries a plurality of guide pins 25 (one shown) which extend axially from the base 21.

The mounting fixture 10 also includes a circular face plate 30 that is secured to the end of the adapter plate sleeve 23. The face plate 30 has a central circular opening 31 formed therethrough. A plurality of radial slots 32 (one shown) are formed in the outer edge of the face plate 30. The slots 32 are spaced equally about the circumference of the face plate 30. Each slot 32 has a cam pin 33 mounted transversely thereacross. The purpose for the slots 32 and the cam pins 33 will be explained below. A plurality of part rests 34 (one shown) are mounted upon the outer surface of the face plate 30. The part rests 34 are spaced equally about the circumference of the face plate 30.

The face plate opening 31 receives a generally cylindrical center sleeve 35. The center sleeve 35 has a central axial bore 36 formed therethrough. A pilot tube 40 that corresponds to a particular wheel design is disposed within the center sleeve bore 36. The pilot tube 40 has a piston bore 41 formed therethrough. A counter bore 42 is formed in the end of the piston bore 41 facing the wheel 15. A flange 43 is formed on the outer end of the pilot tube 40. A first plurality of compression springs 44 (one shown) are disposed between the pilot tube flange 43 and the end of the center sleeve 35 facing the wheel 15.

The pilot tube flange 43 also carries a plurality of locator pins, or pylons, 45 (one shown). As best seen in FIG. 2, each locator pylon 45 includes a mounting shaft 84 extending generally perpendicularly from the pilot tube flange 43. The mounting shaft 84 has a first end 85 and a second end 86. The first end 84 is slidingly received in a corresponding aperture 18 formed in the pilot tube flange 43. A plurality of threads 87 are formed upon the second end 86 of the mounting shaft 84. The locator pylon 45 includes a support shaft 88. The support shaft 88 has a first end 89 adjacent to the mounting shaft 84 and a second end 90. The support shaft 88 has a threaded bore 91 extending longitudinally into the first end 89. The threaded bore 91 cooperates with the support shaft threads 87 to secure the support shaft 88 to the mounting shaft 84. The support shaft 88 cooperates with the mounting shaft 84 to define a fixed axial length for the locator pylon 45. The fixed axial length of the locator pylon 45 is selected to correspond to a specific wheel, such as the wheel 15, as will be discussed below. The support shaft 88 has an annular retaining flange 92 formed about the second end 90. The locator pylon 45 includes a generally cylindrical stop 93 formed from a resilient material. The stop 93 is typically made of an elastomer as to cushion the mounting of the wheel 15 upon the fixture 10. The stop 93 has a first end 94 adjacent to the support shaft retaining flange 92 and a second end 95. The stop 93 also has an annular recess 96 extending into the first end 94. The stop 93 includes an annular lip flange 97, at least partially defining the recess 96. The annular lip flange 97 cooperates with the annular retaining flange 92 to secure the stop 93 to the support shaft 88. The stop 93 is sized to fit the wheel mounting holes 80 of the wheel 15.

Referring again to FIG. 1, the mounting fixture 10 also includes a piston 50 that is disposed within the pilot tube bore 41. The piston 50 has an end 51 facing the wheel 15 that is formed to contact the center portion of a wheel hub. The piston end 51 has a greater diameter than the remainder of the piston 50 and defines a shoulder 52 therebetween. A second plurality of compression springs 53 (one shown) are disposed between the piston shoulder 52 and the pilot tube flange 43.

The mounting fixture 10 further includes an axially movable yoke plate 60 that is disposed within the adapter plate sleeve 23. The yoke plate 60 is circular and has a plurality of guide pin holes 61 formed therethrough. Each of the guide pin holes 61 slidably receives one of the guide pins 25. The yoke plate 60 also has a plurality of radially extending arms 62 (one shown) that are spaced equally about the circumference of the yoke plate 60 and which extend through the adapter plate slots 24. An actuator bar 63 is secured to the center of the yoke plate 60 and extends axially through the adapter plate opening 22. The actuator bar 63 is connected to a conventional means for axially shifting the actuator bar and yoke plate assembly.

A plurality of cam arms 65 (one shown) are pivotally mounted on the ends of the yoke plate arms 62. A first end of each cam arm 65 is secured to each yoke plate arm 62 with a pivot pin 66. The center portion of each cam arm 65 has a generally L-shaped cam slot 67 formed therethrough. The cam slots 67 have a generally axial first portion 67A and a second portion 67B that is directed in a radially inward direction. Each cam slot 67 receives a corresponding cam pin 33. A removable cam arm jaw 68, which is shaped to clamp over a portion of a vehicle wheel rim, is attached to a second end of each cam arm 65.

As indicated above, the mounting fixture 10 is operative for clamping a vehicle wheel 15 to a lathe for machining the wheel 15 to its final shape. As shown in FIG. 1, the vehicle wheel 15 includes an annular wheel rim 70 having a circular wheel disc 71 formed across one end thereof. The wheel rim 70 includes a central drop well 72 and inboard and outboard tire bead seats 73 and 74. The outer ends of the wheel rim 70 are formed into inboard and outboard tire retaining flanges 75 and 76, respectively. The wheel disc 71 includes a central hub 77 supported within the wheel rim 70 by a plurality of wheel spokes 78 (one shown). The hub has a central pilot hole 79 and a plurality of wheel mounting holes 80 (one shown) formed therethrough.

The operation of the prior art mounting fixture 10 will now be described. The actuator bar 63 is axially extended into the adapter plate sleeve 23, axially shifting the yoke plate 60 away from the adapter plate base 21. As the yoke plate 60 is axially displaced, the cam slot 67 in each cam arm 65 slides along the corresponding cam pin 33. The cam pins 33 cooperate with the cam slots 67 to urge the cam arms 65 in an outward radial direction, thereby opening the mounting fixture 10. With the mounting fixture 10 opened, the wheel 15 can be mounted upon the mounting fixture 10. The wheel hub 77 is placed adjacent to the outer end 51 of the piston 50 with the outboard tire bead retaining flange 76 engaging the part rests 34. The locator pylons 45 are received by corresponding wheel mounting holes 80. The actuator bar 63 is then retracted, moving the yoke plate 60 axially towards the adapter plate base 21. As the yoke plate 60 is moved towards the yoke plate base 21, the cam slots 67 in each of the cam arms 65 is drawn back over the cam pins 33. The cam pins 33 cooperate with the cam slots 67 to urge the cam arms 65 in an inward radial direction, thereby causing the jaws 68 to move to a closed position and clamp onto the wheel flange 76. As the cam arms 65 continue to be drawn back, the wheel flange 76 is drawn firmly against the part rests 34. Additionally, the piston end 51 facing the wheel 15 is axially shifted by the wheel hub 77, compressing the first and second sets of compression springs 44 and 53. When the lathe is started, the locator pylons 45 cooperate with the wheel mounting holes 80 to rotate the wheel 15.

While the wheel 15 is shown having a wheel disc 71 located near an end of the wheel rim 70, it will be appreciated that the wheel disc 71 also can be recessed within the wheel rim 70 at a greater or lesser depth. For such wheels, a different pilot tube and piston having a greater or lesser axial length would be substituted for the ones shown in FIG. 1.

As shown in FIG. 1, the locator pylons 45 are positioned to cooperate with the wheel mounting holes 80. As described above, the locator pylons 45 are rigidly mounted upon the pilot tube flange 43 with a fixed axial length. The overall length of the locator pylons 45 is selected as a function of the specific recess depth of the wheel disc 71 within the wheel 15. In order to mount a wheel having a wheel disc with a different recess depth, regardless of the wheel diameter, it is necessary either to replace the entire pilot tube and piston assembly with an assembly that will correspond to the wheel having a wheel disc of differing recess or at least to replace the locator pylons 45 with locator pylons that will cooperate with the wheel having a wheel disc of differing recess. Alternately, a second lathe can be used to machine the wheel of different diameter or the wheel having a wheel disc of differing recess. The procedure to reconfigure the wheel fixture 10 is time consuming and the use of a multiple lathes is costly. Accordingly, it would be desirable to provide a wheel fixture suitable for wheels having wheel discs with different recess depths.

BRIEF SUMMARY OF THE INVENTION

The present invention contemplates a universal wheel pylon and a wheel fixture including the universal wheel pylon for mounting vehicle wheel castings having wheel discs of differing recess depths upon a wheel lathe for machining a final shape.

The present invention contemplates a wheel pylon that includes a tubular mounting shaft having an end stop formed upon a first end thereof and a tubular support shaft having an end stop formed upon a first end thereof with one of the mounting shaft and the support shaft slidably received in the other. The wheel pylon also includes an expansion member disposed within the mounting shaft and the support shaft with the expansion member engaging a surface of the mounting shaft and a surface of the support shaft. The expansion member being operable to urge the support shaft in an axial direction away from the mounting shaft.

The present invention also contemplates a fixture for mounting a vehicle wheel that includes a support plate that is adapted to be attached to a wheel lathe spindle and a clamping mechanism carried by the support plate with the clamping mechanism operable to releasably clamp a vehicle wheel upon the support plate. The mounting fixture also includes at least one of the above described pylons such that a plurality of vehicle wheels having differing wheel disc recess depths may be mounted upon the fixture.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
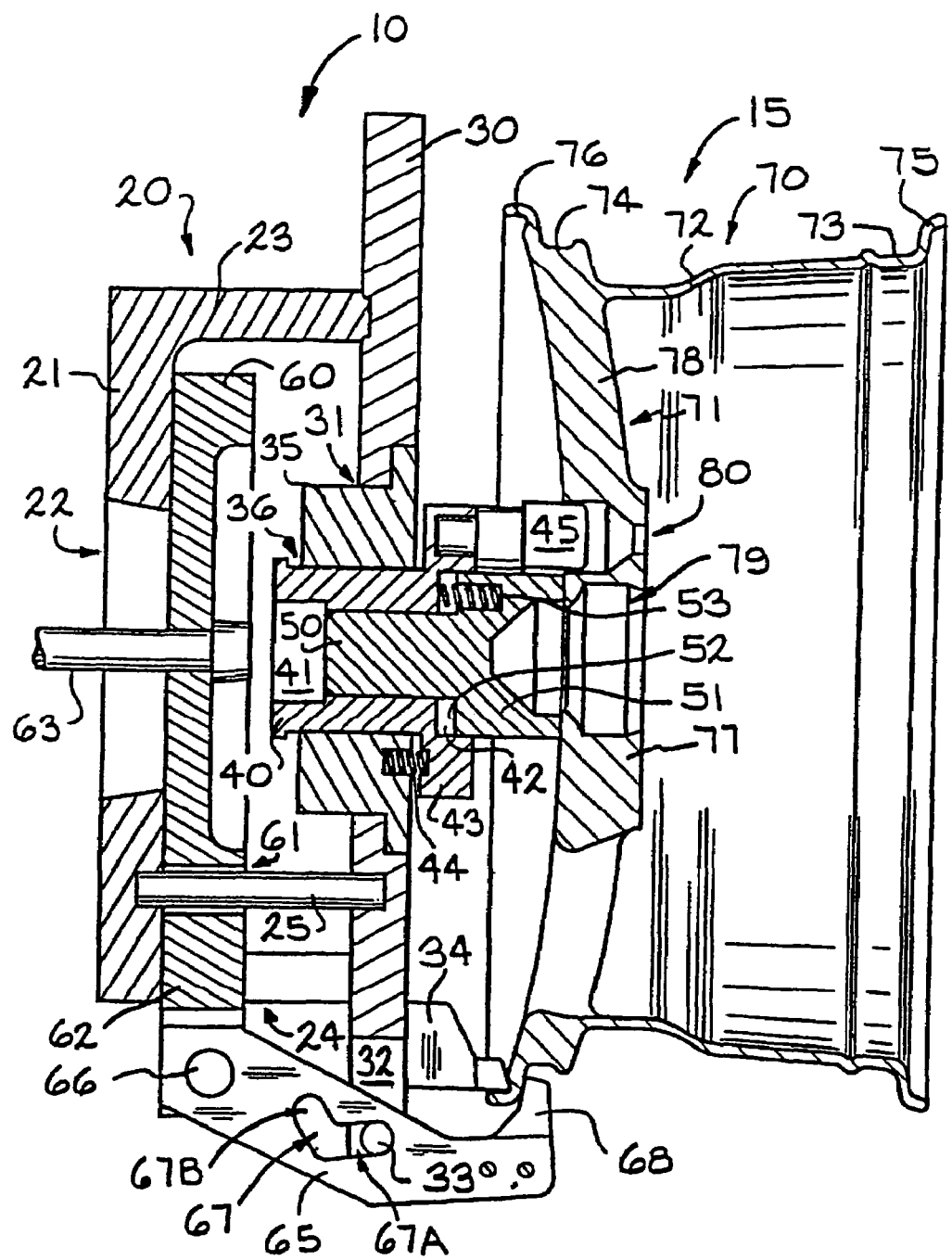
FIG. 1 is a sectional view of a prior art fixture for mounting a vehicle wheel upon a lathe art.

In the following description of the invention, certain terminology will be used for the purpose of reference only, and are not intended to be limiting. Terms such as "upper," "lower," "above," "below," "rightward," "leftward," "clockwise," and "counterclockwise" refer to directions in the drawings to which reference is made. Terms such as "inward" and "outward" refer to directions toward and away from, respectively, the geometric center of the component described. Terms such as "front," "rear," "side," "leftside," "rightside," "top," "bottom," "horizontal," and "vertical" describe the orientation of portions of the component within a consistent but arbitrary frame of reference, which is made clear by reference to the text and the associated drawings describing the component under discussion. Such terminology will include the words specifically mentioned above, derivatives thereof, and words of similar import.

Figure 2:
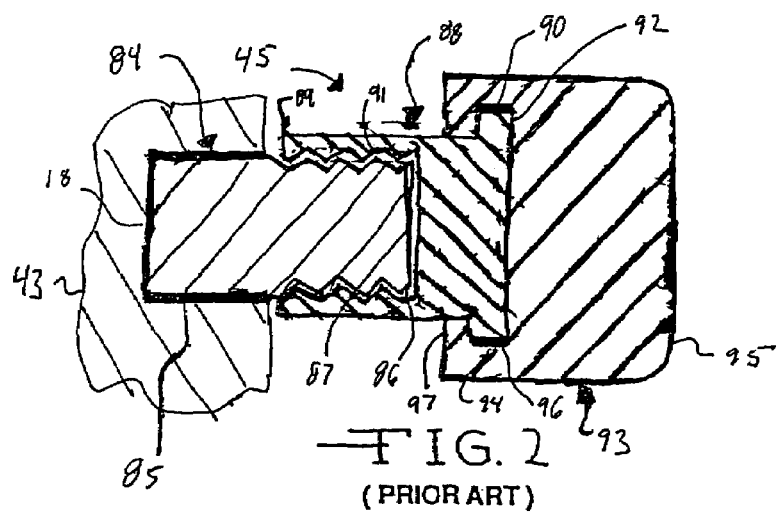
FIG. 2 is a sectional view of a prior art wheel pylon that is included in the fixture shown in FIG. 1.
Figure 3:
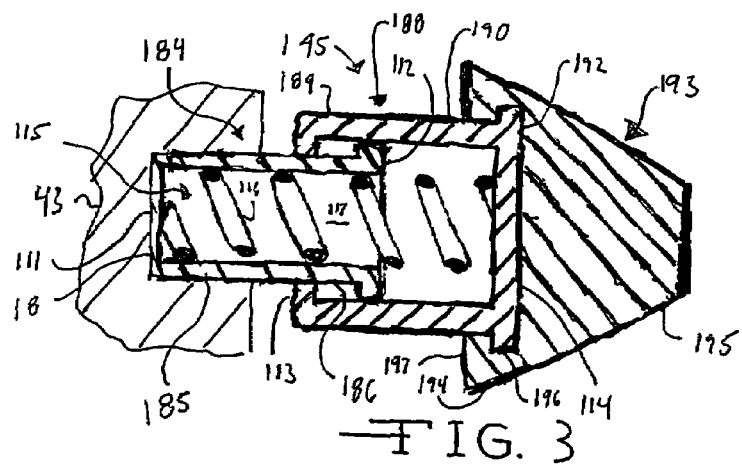
FIG. 3 is a sectional view of a wheel pylon in accordance with the present invention.

Referring again to the drawings, there is illustrated in FIG. 3 an improved wheel pylon 145 according to a preferred embodiment of the present invention. Components shown in FIG. 3 that are similar to components shown in FIG. 2 are labeled with the same numerical identifiers.

The locator pylon 145 includes a tubular mounting shaft 184 extending generally perpendicularly from the pilot tube flange 43. The mounting shaft 184 has a first end 185 and a second end 186 with the first end 185 being slidingly received in the corresponding aperture 18 formed in the pilot tube flange 43 to a sufficient depth that the mounting shaft 184 is retained in the aperture 18. The mounting shaft 184 includes a mounting shaft end surface 111 formed at the first end 185. The end surface 111 is shown in FIG. 3 as extending across the entire first end 185 of the mounting shaft 184 to form an enclosed end for the shaft. However, it will be understood that the end surface 111 may be any other suitable surface such as a flange (not shown), a radially extending tab (not shown), a plurality of circumscribed tabs (not shown), or any other suitable surface. An annular mounting shaft end flange 112 is formed upon the second end 186 of the mounting shaft 184 and extends radially outward therefrom.

The locator pylon 145 includes a tubular support shaft 188 that slidably receives the mounting shaft 184. The inside diameter of the support shaft 188 is greater than the outside diameter of the mounting shaft 184 such that the second end 186 of the mounting shaft 184 is slidably received within the support shaft 188. The support shaft 188 has a first end 189 and a second end 190 with the first end 189 extending over the mounting shaft second end 186. The support shaft 188 also has an annular end flange 113 formed upon the first end 189 that extends radially inward therefrom. As shown in FIG. 3, the support shaft end flange 113 slidably engages the outer surface of the mounting shaft 184 while the mounting shaft end flange 112 slidably engages the inner surface of the support shaft 188. The mounting shaft end flange 112 and the support shaft end flange 113 cooperate to retain the second end 186 of the mounting shaft 184 within the first end 189 of the support shaft 188. Additionally, the end flanges 112 and 113 also cooperate to axially align the support shaft 188 with the mounting shaft 184. While the end flanges 112 and 113 are preferably formed as rings, it will be understood that other retaining means may be used, such as, for example, circumferentially spaced tabs (not shown).

The support shaft 188 further includes a support shaft end surface 114 formed at the second end 190. As shown in FIG. 3, the support shaft end surface 114 extends across the entire radial cross section to form an end cap for the second end 190. However, it will be understood that the end surface 114 may have any suitable form, such as a flange (not shown), a radially extending tab (not shown), a plurality of circumscribed tabs (not shown), or any other suitable form. As also shown in FIG. 3, the support shaft end surface 114 extend in outward radial direction from the support shaft 188 to form an annular retaining flange 192.

The locator pylon 145 includes a generally conical stop 193 formed from a resilient material. The stop 193 is preferably made of an elastomer and is shaped as a truncated cone as to fit a variety of wheel mounting holes. The stop 193 has an annular recess 196 extending into a first end 194 that includes an annular lip flange 197, at least partially defining the recess 196. The second end 190 of the support shaft 188 extends into the recess 196 with the retaining flange 192 cooperating with the annular lip flange 197 to secure the stop 193 upon the support shaft 188.

The locator pylon 145 includes an expansion member 115, which, in the preferred embodiment, is a helical spring 116. The ends of the spring 116 engage both the mounting shaft end surface 111 and the support shaft end surface 114. The spring 116 is operable to urge the mounting shaft 184 and the support shaft 188 axially away from one another, i.e. to lengthen the wheel pylon 145. It will be understood that movement of the mounting shaft 184 and the support shaft 188 relative to each other is intended to include any arrangement where at least one of the mounting shaft 184 and the support shaft 188 is in movement while the other is stationary. In an alternative embodiment, a volume of compressible fluid 117 is disposed within the pylon 145 (not shown) with the spring 116, such that the compressible fluid 117 is operable to move the mounting shaft 184 and the support shaft 188 relative to each other. It will be understood that the pylon 145 need not include both the spring 116 and the compressible fluid 117. For example, the pylon 145 may include only the spring 116, or only the compressible fluid 117. Furthermore, the invention also contemplates that the pylon 145 may include any device operable move the mounting shaft 184 and the support shaft 188 relative to each other, such as a resilient elastomer or any other suitable device.

Figure 4:
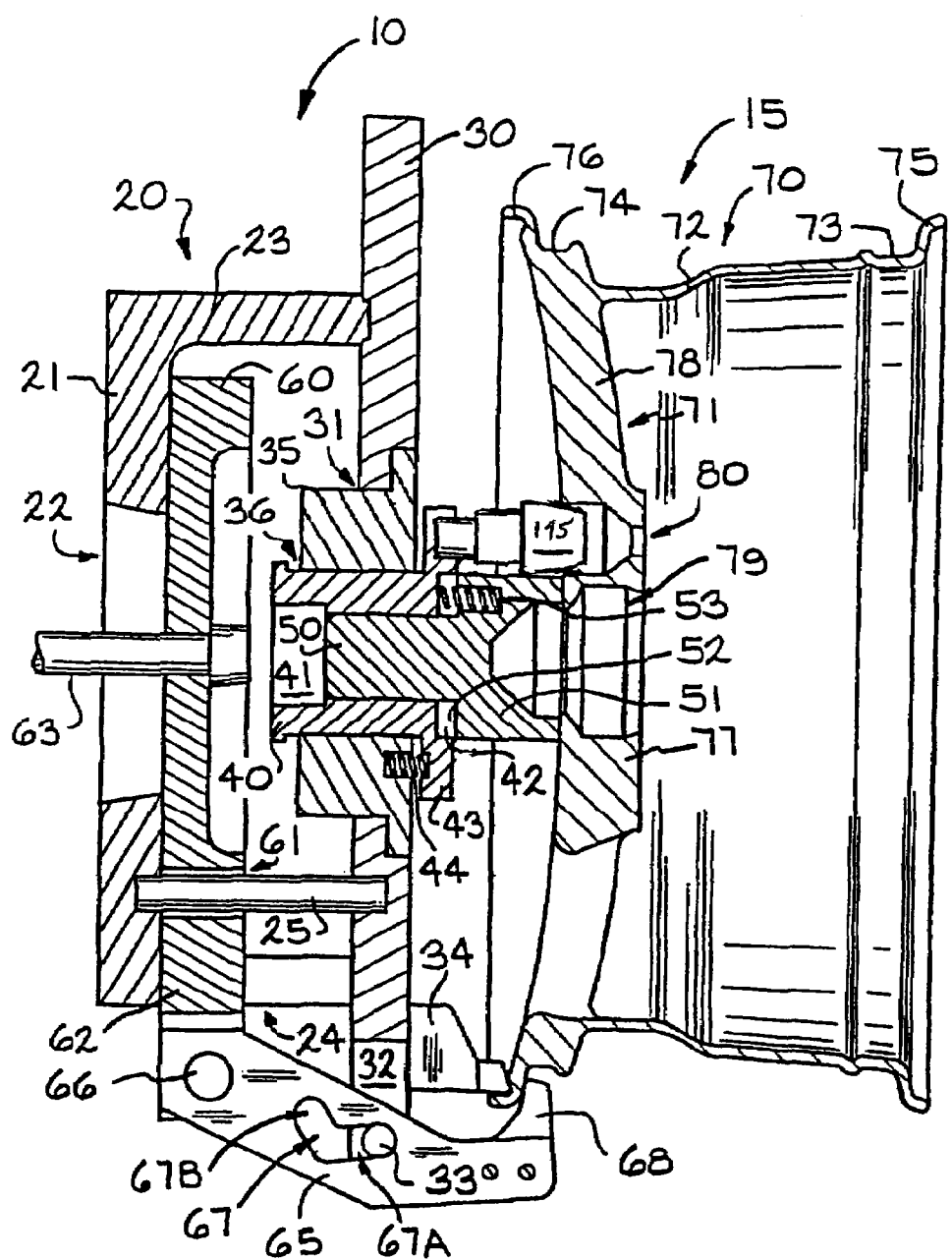
FIG. 4 is a sectional view of a fixture for mounting the vehicle wheel of FIG. 1 upon a lathe that includes the wheel pylon shown in FIG. 3.
Figure 5:
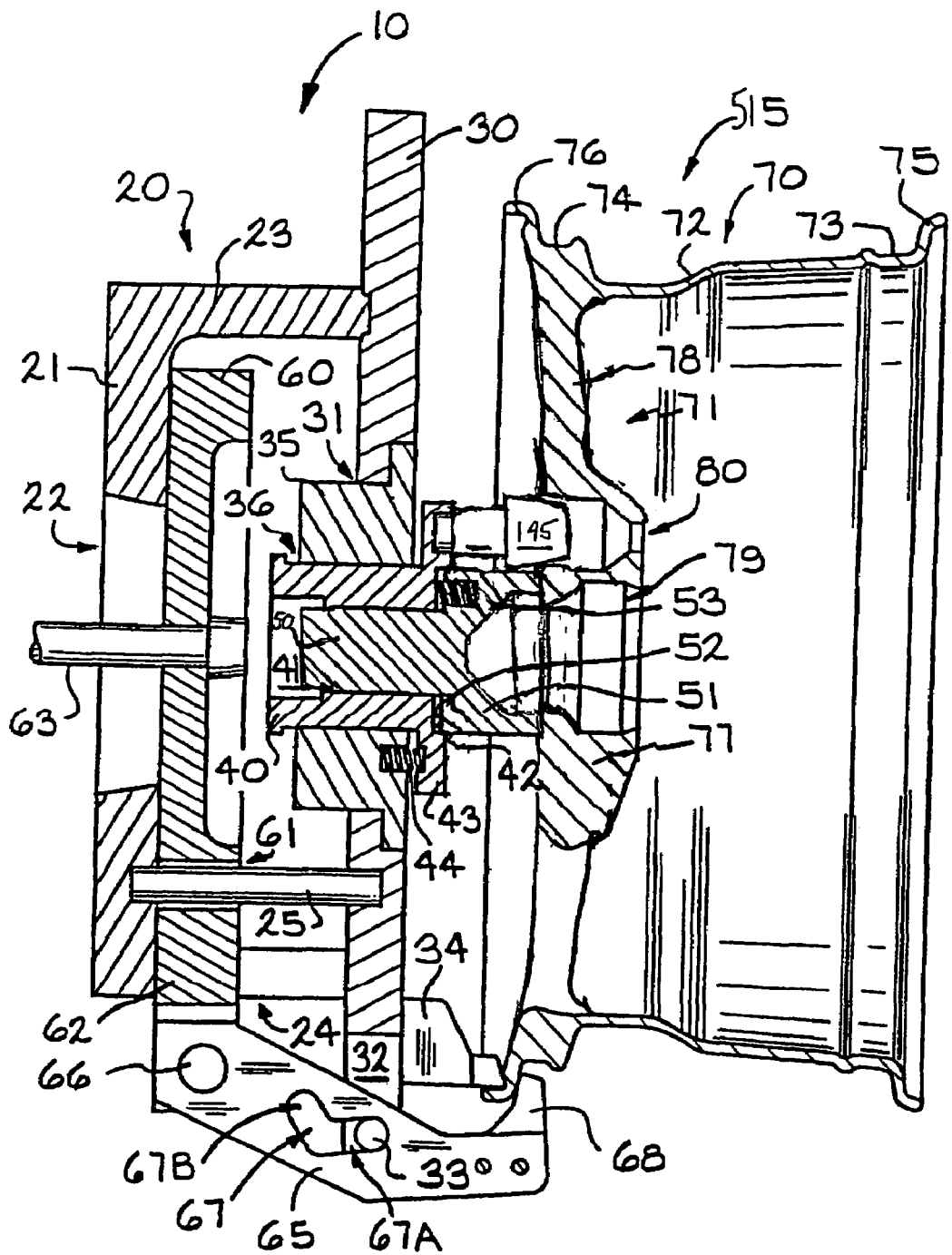
FIG. 5 is a sectional view illustrating the mounting of a vehicle wheel having a wheel disc depth that is less than the wheel disc depth shown in FIG. 4.
Figure 6:
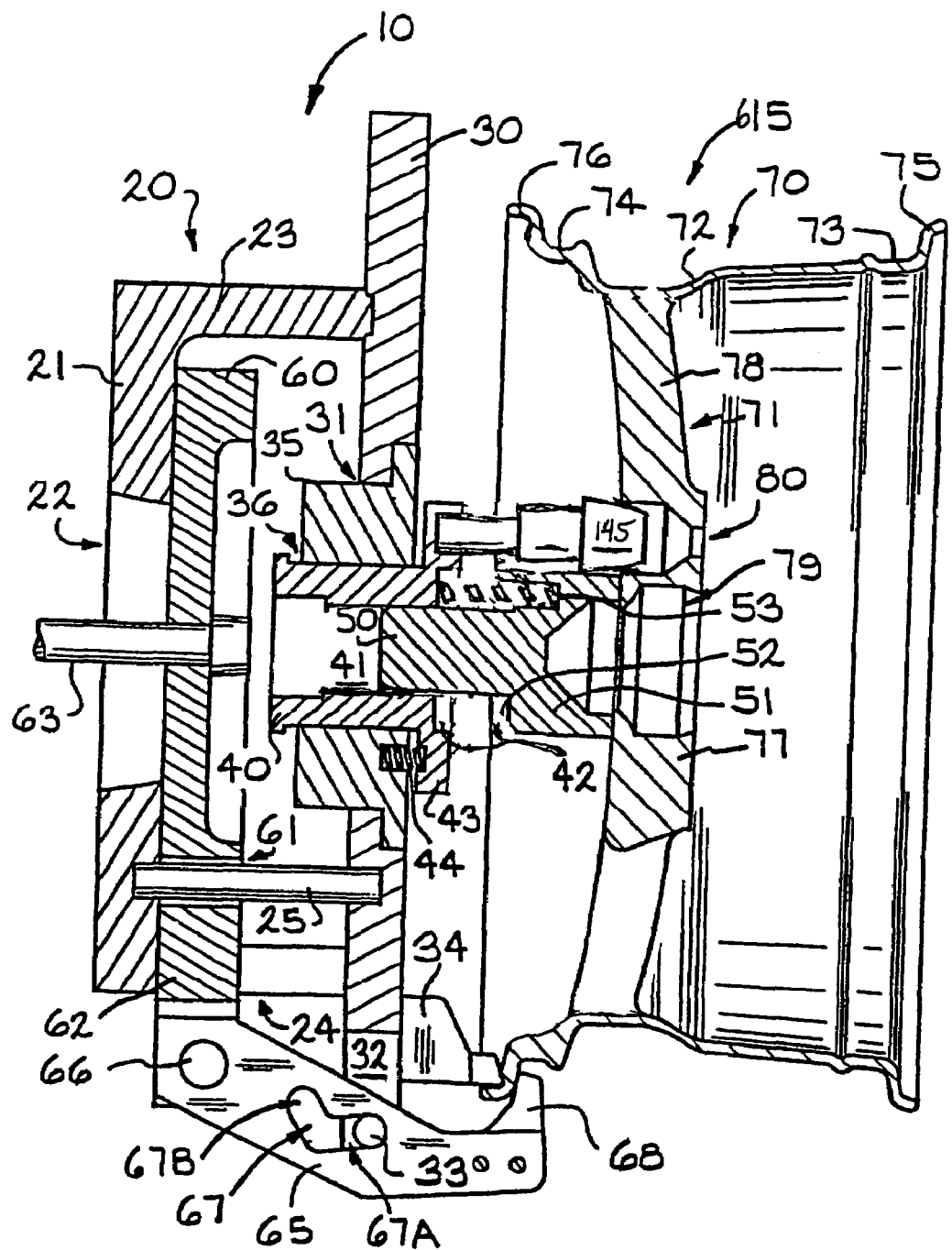
FIG. 6 is a sectional view illustrating the mounting of a vehicle wheel having a wheel disc depth that is greater than the wheel disc depth shown in FIG. 4.

There is illustrated in FIGS. 4-6 the improved wheel pylon 145 as utilized in cooperation with the wheel fixture 10. Components shown in FIGS. 4-6 that are similar to components shown in FIG. 1 are labeled with the same numerical identifiers. As shown in FIGS. 4-6, the locator pylons 145 are positioned to cooperate with the wheel mounting holes 80. The locator pylons 145 are mounted upon the pilot tube flange 43. Before a wheel is mounted upon the fixture 10, the pylon 145 is in a fully extended position, as the expansion member 115 has completely urged the support shaft 188 away from the mounting shaft 184, as limited by the flanges 112 and 113. The maximum length of the locator pylons 145 is a function of the lengths of the mounting shaft 184 and the support shaft 188, and the expansion strength of the expansion member 115.

When a wheel is mounted upon the wheel fixture 10 utilizing the wheel pylon 145, the pylon stops 193 engage the wheel mounting holes 80 and the pylons 145 are compressed as the wheel 15 is mounted. As described above, the stop 193 is made of an elastomer so as to cushion the mounting of the wheel 15 upon the fixture 10. The telescoping design of the wheel pylons 145 allows mounting a plurality of wheels having wheel discs with different recess depths upon the wheel fixture 10 without having to change the pylons, as was the case with the prior art foxed length pylons 45. For example, when the wheel 15 shown in FIG. 1 is mounted upon the wheel fixture equipped with the present invention, as shown in FIG. 4, the pylon 145 a compressed length that is the same as the fixed length of the prior art pylon 45. However, another wheel 515, shown in FIG. 5, has a disc face that is recessed less than the wheel disc shown in FIG. 4. Thus, in FIG. 5, the pylon 145 is compressed axially greater than shown in FIG. 4 to accommodate the decrease in wheel disc depth. Additionally, another wheel 615, shown in FIG. 6, has a disc face that is recessed greater than the wheel disc shown in FIG. 4. Thus, the pylon 145 is compressed axially less than shown in FIG. 4 to accommodate the increase in wheel disc depth.

Figure 7:
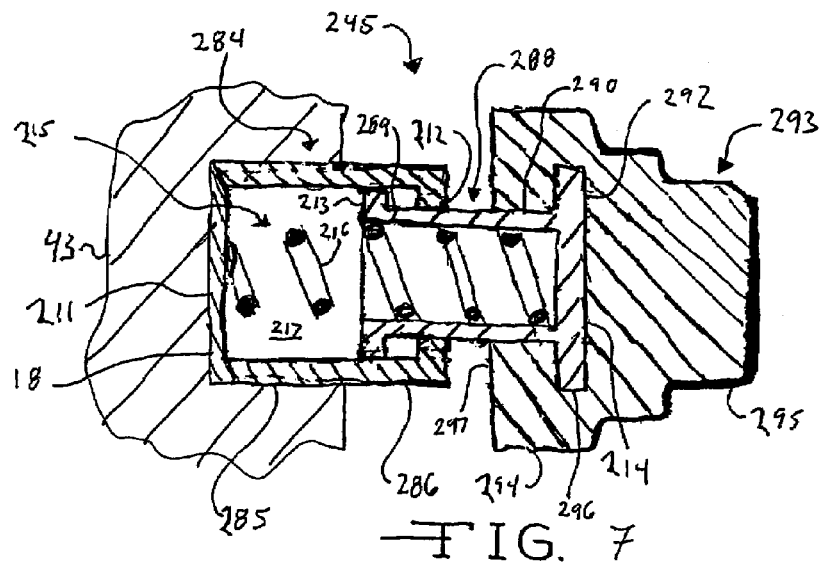
FIG. 7 is a sectional view of an alternate embodiment of wheel pylon shown in FIG. 3.

There is illustrated in FIG. 7 an improved wheel pylon 245 according to an alternate embodiment of the present invention. Components shown in FIG. 7 that are similar to components shown in FIGS. 2 and 3 are labeled with the same numerical identifiers. The locator pylon 245 includes a tubular mounting shaft 284 extending generally perpendicularly from the pilot tube flange 43. The mounting shaft 284 has a first end 285 and a second end 286. The first end 284 is slidingly received in a corresponding aperture formed in the pilot tube flange 43. The mounting shaft 284 preferably includes a mounting shaft end surface 211 formed at the first end 284. The end surface 211 is similar to the end surface 111 described above. An annular mounting shaft end flange 212 is formed upon the second end 286 of the mounting shaft 284, for a similar purpose as the annular mounting shaft flange 112 described above. As shown in FIG. 7, the annular mounting shaft flange 212 extends radially inward from the second end 286.

The locator pylon 245 also includes a tubular support shaft 288 that is slidably received by the mounting shaft 284. The support shaft 288 has a first end 289 and a second end 290 with the first end 289 extending into the mounting shaft 284. The inside diameter of the mounting shaft 284 is greater than the outside diameter of the support shaft 288 such that the first end 289 of the support shaft 288 is slidably received within the mounting shaft 284. The support shaft 288 has an annular support shaft end flange 213 formed upon the first end 189 that extends radially outward therefrom. As shown in FIG. 7, the support shaft end flange 213 slidably engages the inner surface of the mounting shaft 284 while the mounting shaft end flange 212 slidably engages the outer surface of the support shaft 288. The end flanges 212 and 213 cooperate to retain the first end 289 of the support shaft 288 within the mounting shaft 284. Additionally, the end flanges 212 and 213 also cooperate to axially align the support shaft 288 with the mounting shaft 284. While the end flanges 212 and 213 are preferably formed as rings, it will be understood that other retaining means may be used, such as, for example, circumferentially spaced tabs (not shown). The support shaft 288 preferably includes a support shaft end surface 214 formed at the second end 290, for a purpose similar to the end surface 114 described above. Similar to the pylon 145 described above, the support shaft 288 also has an annular retaining flange 292 extending in an outward radial direction from the second end 290.

The locator pylon 145 includes a stepped stop 293 formed from a resilient material. The stop 293 is preferably made of an elastomer, as described above, with the steps sized to fit a variety of standard wheel mounting hole sizes. The stop 293 also has an annular recess 296 extending a first end 294 that includes an annular lip flange 297, at least partially defining the recess 296. The second end 290 of the support shaft 288 extends into the recess 296 with the retaining flange 292 cooperating with the annular lip flange 297 to secure the stop 293 upon the support shaft 288. As an alternative to the stepped shape of the stop 293, the stop 293 may be shaped as a truncated cone, similar to the stop 193 shown in FIG. 3. Similarly, the stop 193 mounted upon the pylon 145 may be shaped as a stepped stop similar to the stop 293. It will be understood, however, that stops 193 and 293 also may have any suitable shape.

The locator pylon 245 includes an expansion member 215. The expansion member may include a helical spring 216 similar as the expansion member 115 described above. Alternately a volume of compressible fluid 217 may be utilized for the expansion member, with, or without, the helical spring 216.

The principle and mode of the invention have been described and illustrated in its preferred embodiment. However, it must be understood that the invention may be practiced otherwise than as specifically explained and illustrated without departing from its spirit or scope.

What is claimed is:

1. A wheel pylon comprising:
    a tubular mounting shaft adapted to be carried upon a wheel mounting fixture, said mounting shaft having an end stop formed upon a first end thereof;
    a tubular support shaft having an end stop formed upon a first end thereof, one of said mounting shaft and said support shaft slidably received in the other; and
    an expansion member disposed within said mounting shaft and said support shaft, said expansion member engaging a surface of said mounting shaft and a surface of said support shaft end stop, said expansion member operable to urge said support shaft in an axial direction away from said mounting shaft, such that the pylon can support any one of a plurality of vehicle wheels having differing wheel disc depths.

2. The wheel pylon of claim 1 wherein said support shaft is received by said mounting shaft, said support shaft end stop extending radially outward from said first end of said support shaft to slidably engage an interior surface of said mounting shaft, said mounting shaft end stop extending radially inward from said first end of said mounting shaft to slidably engage an exterior surface of said support shaft.

3. The wheel pylon of claim 2 wherein said tubular mounting shaft includes a mounting shaft end surface formed at a second end of the mounting shaft and said tubular support shaft includes a support shaft end surface formed at a second end of the mounting shaft, said mounting shaft end surface and said support shaft end surface engaging and retaining said expansion member within said shafts.

4. The wheel pylon of claim 3 wherein said expansion member includes a helical spring having a first end engaging said end surface of said mounting shaft and a second end engaging said end surface of said support shaft end surface, said helical spring being operable to urge said support shaft in an axial direction away from said mounting shaft.

5. The wheel pylon of claim 4 further including a stop formed from a resilient material carried upon a second end of said support shaft.

6. The wheel pylon of claim 5 wherein said stop has an annular recess formed therein that includes an annular lip flange and further wherein a retaining flange is formed upon a second end of said support shaft, said annular recess receiving said second end of said support shaft with said annular lip flange cooperating with said retaining flange to retain said stop upon said support shaft end.

7. The wheel pylon of claim 6 wherein said stop has a truncated conical shape.

8. The wheel pylon of claim 7 wherein said mounting shaft and annular support shaft end stops are formed as an annular flange.

9. A fixture for mounting a vehicle wheel comprising:
a support plate that is adapted to be attached to a wheel lathe spindle;
a clamping mechanism carried by said support plate, said clamping mechanism operable to releasably clamp a vehicle wheel upon said support plate; and
at least one wheel pylon, said wheel pylon including:
a tubular mounting shaft carried by said support plate, said mounting shaft having an end stop formed upon a first end thereof,
a tubular support shaft having an end stop formed upon a first end thereof, one of said mounting shaft and said support shaft slidably received within the other, and
an expansion member disposed within said mounting shaft and said support shaft, said expansion member engaging a surface of said mounting shaft and a surface of said support shaft, said expansion member being operable to urge said support shaft in an axial direction away from said mounting shaft, such that a plurality of vehicle wheels having differing wheel disc recess depths can be supported upon said wheel pylon and thereby be mounted upon the fixture.

10. The wheel pylon of claim 6 wherein said stop has a stepped shape.

* * * * *